United States Patent
Khattak et al.

(10) Patent No.: US 8,693,966 B2
(45) Date of Patent: Apr. 8, 2014

(54) METHOD FOR BASE STATIONS FOR OVERALL CELL SIGNAL DECODING

(75) Inventors: Shahid Khattak, Dresden (DE); Patrick Marsch, Dresden (DE); Peter Rost, Dresden (DE)

(73) Assignee: Vodafone Holding GmbH, Dusseldorf (DE)

( * ) Notice: Subject to any disclaimer, the term of this patent is extended or adjusted under 35 U.S.C. 154(b) by 89 days.

(21) Appl. No.: 12/661,414

(22) Filed: Mar. 15, 2010

(65) Prior Publication Data

US 2010/0323706 A1 Dec. 23, 2010

Related U.S. Application Data

(63) Continuation of application No. PCT/DE2008/001524, filed on Sep. 15, 2008.

(30) Foreign Application Priority Data

Sep. 14, 2007 (DE) .......................... 10 2007 043 949
Nov. 29, 2007 (DE) .......................... 10 2007 057 860

(51) Int. Cl.
  *H04B 1/18* (2006.01)
  *H04W 36/00* (2009.01)
  *H04W 72/00* (2009.01)
  *H04B 7/00* (2006.01)

(52) U.S. Cl.
  USPC ........ 455/151.1; 455/135; 455/436; 455/439; 455/442; 455/444; 455/452.2; 455/504; 455/524; 455/526

(58) Field of Classification Search
  USPC ........... 455/436, 439, 441–442, 452.1, 452.2, 455/442–444, 504, 524–526, 101, 151.1
  See application file for complete search history.

(56) References Cited

U.S. PATENT DOCUMENTS

| | | | |
|---|---|---|---|
| 5,867,791 A * | 2/1999 | Chambert | 455/525 |
| 6,934,546 B1 * | 8/2005 | Corbett et al. | 455/441 |
| 2002/0080719 A1 * | 6/2002 | Parkvall et al. | 370/235 |
| 2007/0155388 A1 * | 7/2007 | Petrovic et al. | 455/442 |
| 2007/0281695 A1 * | 12/2007 | Lohr et al. | 455/436 |

(Continued)

FOREIGN PATENT DOCUMENTS

| WO | WO 2006/083201 | * | 8/2006 | ............... H04B 7/06 |
|---|---|---|---|---|
| WO | WO 2006/083201 A1 | * | 8/2006 | ............... H04B 7/06 |

OTHER PUBLICATIONS

Base-Station Selection in Cooperative Single Frequency Cellular Network; Mohamed Kamoun and l_~lurent Mazet.*

(Continued)

*Primary Examiner* — Inder Mehra
(74) *Attorney, Agent, or Firm* — Lawrence G. Fridman

(57) ABSTRACT

A method for filtering out a useful signal of a mobile radio terminal from a plurality of superimposed signals having a signal quality received by base stations in a cellular mobile radio network. The superimposed signal of the mobile radio terminal is detected by base stations that are reached and the signal quality of the received and superimposed signal of every base station reached is determined. The signal quality of a selected base station is then transmitted to a decision element and a selection of a selected base station is made by the decision element to decode the useful signal of the mobile radio terminal. The invention also relates to a device for filtering out a useful signal of a mobile radio terminal from a plurality of superimposed signals received by base stations in a cellular mobile radio network.

11 Claims, 2 Drawing Sheets

(56) References Cited

U.S. PATENT DOCUMENTS

2008/0139130 A1* 6/2008 Zhao et al. ............... 455/90.2
2008/0167047 A1* 7/2008 Abedi ....................... 455/442

OTHER PUBLICATIONS

Mobile Communication system, Base system and Base system Controller; Publication No. 11-308662; Date of Publication of Application: May 11, 1999.*

Publication by Mohamed Kamoun and Laurent Mazet entitled "Base-Station Selection in Cooperative Single Frequency Cellular Network", Jun. 2007 IEEE.

Publication by Andreas F. Molisch, Moe Z. Win, Yang-Seok Choi and Jack H. Winters entitled "Capacity of MIMO Systems with Antenna Selection", IEEE Transactions on Wireless Communications, vol. 4, No. 4, Jul. 2005.

* cited by examiner

METHOD FOR BASE STATIONS FOR OVERALL CELL SIGNAL DECODING

This application is a Continuation of International Patent Application No. PCT/DE2008/001524 filed Sep. 15, 2008 claiming priority of German Patent Applications No. 10 2007 043 949.2 filed Sep. 14, 2007 and No. 10 2007 057 860.3 filed Nov. 29, 2007

FIELD OF THE INVENTION

The invention relates to a method and a device for filtering out a wanted/useful signal of a mobile station from a plurality of superimposed signals received by a base station in a cellular mobile network, wherein the superimposed signals are transmitted to a transmission resource.

BACKGROUND OF THE INVENTION

Mobile networks, such as according to the GSM or UMTS standards are set up in a cellular manner. This means that a mobile network comprises cell towers, so called base stations. Such base stations have a coverage area adapted for receiving radio signals from a mobile station and transmit corresponding signals in return. This coverage area of a base station forms a mobile network cell. Furthermore, such mobile network cells may overlap. Commonly, different frequencies are used in adjacent mobile network cells in order to avoid overlapping or interferences.

However, there are known systems where several base stations simultaneously receive signals from mobile stations. With such an overall cellular cooperative detection of signals a signal is received depending on the position of the mobile station where each of the participating base stations receives a different signal which depends on the damping and the run time. Using the same data transmission resource, such as, for example, the same frequency or the same time window, for several mobile stations a superimposed or interfered signal can be received by each base station. This received superimposed signal comprises the corresponding signals of all mobile stations using the same transmission resource.

With suitable methods the signals of each individual mobile station can be filtered out from the superimposed received signals of the participating base stations. For this purpose the respective superimposed signals received by the various base stations must be collected and processed. Normally, the received superimposed signals of each base station are digitized and forwarded to a central processing unit. The central processing unit can be provided in a base station or separately in the mobile network. The superimposed signals are compared in the central processing unit and the received signal of each mobile station is filtered out. Then, a corresponding wanted/useful signal is decoded from the received signal of each participating mobile station. This method causes improvement of the achievable data transmission rates of participating mobile stations.

The considerable data transfer between the base stations and the central processing unit is disadvantageous with the known methods for the overall cellular, cooperative detection of signals of a plurality of mobile stations using the same transmission resource. In order to centrally process and decode the superimposed signals received by all participating base stations they are digitized and transmitted through network connections to the central processing unit. Due to this large data volume the network resources are stressed very much. If necessary, further transmission capacity must be installed, bought or rented which is very costly.

SUMMARY OF THE INVENTION

One of the essential aspects of the invention relates to a method of filtering out a wanted/useful signal of a mobile station from a plurality of superimposed signals with the following steps:
a) detecting the superimposed signal of the mobile station with a reached base station,
b) determining the signal quality of the received and superimposed signal for each reached base station,
c) transmitting the signal quality to a decision device, and
d) selecting a selected base station for decoding the wanted/useful signals of the mobile station by means of the decision device Another aspect of the Invention relates to a device of the above mentioned kind for filtering out a wanted/useful signal of a mobile station from a plurality of superimposed signals wherein
a) means for detecting the superimposed signal of the mobile station with reached base stations,
b) means for determining the signal quality of the received and superimposed signal for each reached base station,
c) transmission means for transmitting the signal quality to a decision device, and
d) selection means for selecting a selected base station for decoding the wanted/useful signals of the mobile station by means of the decision device.

The embodiments of the invention are described below in greater detail with reference to the accompanying drawings.

DETAILED DESCRIPTION OF THE INVENTION

Figure 1:
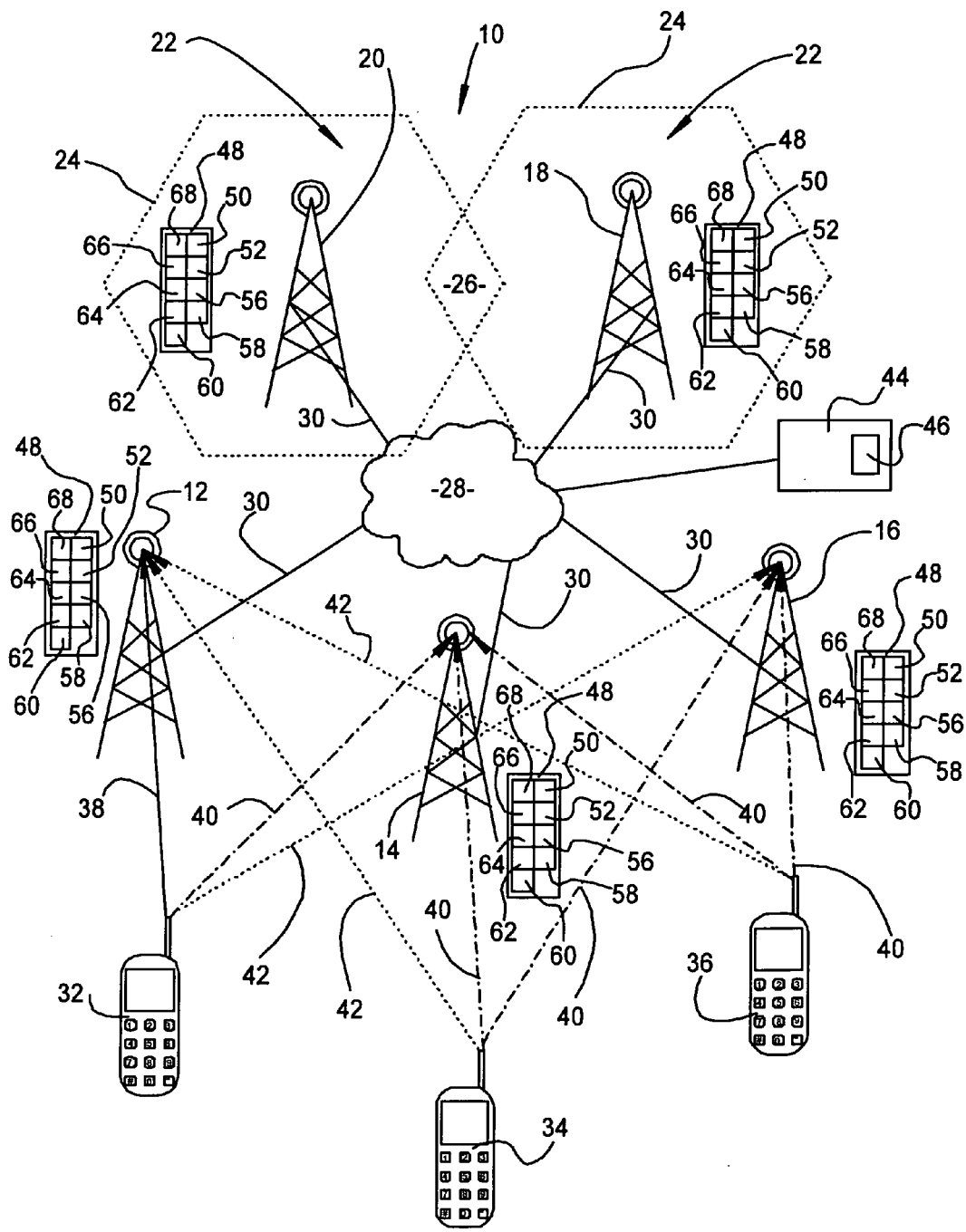
FIG. 1 is a schematic principle diagram showing a mobile network utilizing the device according to the present invention.

In the present invention the received superimposed signals of all reached base stations are not collected by a central processing unit which is fixed from the begin for subsequent evaluation and decoding but that the signal data are processed in one or more selected participating base stations depending on their signal quality. For this purpose the signal quality, for example the signal-interference-noise-ratio, is determined at first for each participating base station and transferred to a decision device.

Using the signal qualities the decision device selects one base station for processing the superimposed signals and for decoding the wanted/useful signal of one or more mobile stations. At first a determination of the necessity can be carried out where it is determined if it is necessary at all to have several base stations cooperating for the generation of a wanted/useful signal. If this is the case, it is checked to what extent data must be exchanged. It is, for example, possible to transmit the entire received signal, one or more wanted/useful signals or portions of the aforementioned signals. This determination of the necessity may also be iterated. If a base station is capable of completely decoding a wanted/useful signal, this serves as an indication to the other participating base stations. This is because the data exchange is not necessary anymore.

Decisions related to the format and the amount of the data to be exchanged between the base stations are made in such a way that a metric defined by the system operator is optimized. It is advantageous for a system operator when the achievable data rates of the mobile stations in a cellular system can be increased by cooperation of the base stations. However, this depends on the system's operator. For example, it is considered to be important to increase the achievable data rates of weak, disadvantaged mobile stations in the system or important when the sum of all data rates shall be maximized. Furthermore, each possible increase of the data rates must be considered relative to the costs and efforts involved with the basic form of cooperation. It must be assumed therein, that the amount of data which must be exchanged between base stations represents one of the most critical aspects as this may be under certain circumstances involved with high costs for the network operator. It is possible, that a system operator invests once in a certain connection infra structure between base stations and intends to use them during operation of the system as best as possible and for an increase of data rates. An increased exchange of data between base stations exceeding the installed infra structure is not possible in this case. Alternatively, a system operator may rent connection capacity between base stations if needed for a short period of time. In this case there is no precise limitation of the entire capacity of the connections. However, it must be considered if each possible increase of the data rates of one or more mobile stations justifies the necessary connection rates required for the cooperation of the base stations.

In other words, a metric function must be defined receiving the achievable data rates of all mobile stations and the required amount of data which must be exchanged between base stations as entry parameters and provides a global evaluation value as an exit parameter. Any decision related to the format and the amount data to be exchanged between base stations for increasing the data rates must be reviewed in such a manner that the evaluation value defined by the system operator is maximized.

In particular, a minimization of the amounts of data which is transmitted may be considered also. Due to the selection of a suitable base station with the method according to the present invention or with means of the device according to the present invention the data transfer is considerably reduced. The received signals of all base stations are not transmitted to an a priori determined processing unit anymore. Depending on the signal qualities at each time a suitable base station is now selected for decoding the wanted signal of a mobile station. Signals received by the selected base station are not forwarded anymore but directly processed. The selected base station transmits only information about the signal quality to the decision device. The invention ensures that the decoding of the signals can be effected in a bases station selected depending on the received signal qualities considering the aspect of a minimum data transfer.

As to one aspect of the method for filtering out a wanted signal of a mobile station from a plurality of superimposed signals, the reached base stations transmit their received signals only to the selected base station for filtering out the wanted signal, if the received signals support the filtering out the wanted signal. Preferably, the received signals are transmitted in a digitized form. By this measure an unnecessary transmission of signals is avoided which are not needed for the filtering out the wanted signal. If, for example, a base station receives a superimposed signal from two mobile stations a signal from a third mobile station received by a further base station cannot be used for filtering out the wanted signal of one of the first two mobile stations. Furthermore, it is also possible to transmit only the portion of a received signal necessary for filtering out a wanted signal. Thereby, a data transmission volume is significantly reduced with overall cellular cooperative reception and filtering out signals.

In a further embodiment of the method of the invention initially the decodability of a wanted signal of a mobile station is determined from the superimposed signals received at a reached base station. If the wanted/useful signal can be decoded from the received signal the wanted/useful signal is decoded and transmitted to the selected base station. If the wanted/useful signal cannot be decoded the received superimposed signal is transmitted to the selected base station. The amount of data of the decoded wanted/useful signal is essentially smaller than the amount of data of the corresponding superimposed received signal. The wanted/useful signal is suitable for filtering out from other wanted/useful signals from another received signal as the superimposed received signal. By transmitting the wanted/useful signal instead of a digitized superimposed received signal the amount of data which must be transmitted is again essentially reduced.

According to a further embodiment of the method of the present invention, the selection of the selected base station is effected from one of the base stations which does not receive directly decodable superimposed signals. Superimposed signals which are not directly decodable are transmitted to the selected base station for filtering out and decoding and further processed there together with signals received by other base stations. With the selection of a base station which does not receive directly decodable signals as a base station where the filtering out and decoding of the wanted/useful signals is effected it is avoided to transmit superimposed signals received by this base station. This also will lead to a smaller data transmission volume. However, a base station may also be selected which may decode the signal of one or more end stations but is nevertheless suitable for the filtering out wanted/useful signals of other end stations.

As to still another aspect of the method of the present invention for filtering out a wanted/useful signal of a mobile station from a plurality of superimposed signals, the decision device is centrally provided as a unit in the mobile network. The central decision device is located either in one of the participating base stations or separately in the mobile network. All base stations participating at the overall cellular cooperative reception send information about the respective signal quality to the decision device. Using the signal qualities the decision device decides which base station shall be used for filtering out the wanted/useful signals. Due to the central formation of the decision device an optimum decision is made possible.

In some modifications of an overall cellular cooperative reception of base stations a central decision device causes disadvantages. For example, with very many participating base stations a considerable amount of information data must be transmitted to the decision device. Furthermore, the decision device must be designed very large for processing the information data. Therefore, in a further advantageous variation of the method according to the present invention the decision device is distributed on several base stations in the mobile network in a decentralized manner. Thereby, individual, decentralized components of the decision device will be realized in a simpler and cheaper manner. Furthermore, the data transfer of information data is reduced.

As to one aspect of the device for filtering out a wanted/useful signal of a mobile station from a plurality of superimposed signals according to the present invention, an arrangement is provided and used by the reached base stations to transmit their received signals to the selected base station for filtering out the wanted/useful signal. In the selected base station the superimposed signals transmitted by the reached base stations are commonly evaluated and the signal of each participating mobile station filtered and the respective wanted/useful signal decoded. Thereby, an effective, overall cellular and cooperative reception and processing of signals of several mobile stations is enabled. Preferably, only received superimposed signals from base stations are transmitted which are required for filtering out and decoding of the wanted/useful signals. By avoiding the transmission of received signals which are not needed a substantial reduction of the data transmission volume is achieved.

As to another aspect of the device of the present invention, the reached base stations are provided with a determination device for determining the decodability of a wanted/useful signal of a mobile station from the received superimposed signals. If there is a sufficient signal quality the wanted/useful signal is also decoded with means provided for decoding and transmission and forwarded to the selected base station if it is required for filtering out from other wanted/useful signals. By transmitting a wanted/useful signal having a smaller data volume instead of an extensive digitized superimposed received signal transmission capacities are saved.

A further aspect of the device of the invention includes an arrangement provided for transmitting the received superimposed signals to the selected base station in case of insufficient signal quality of the received signal for decoding. The received superimposed signal is forwarded in a digitized form and used by the selected base station for filtering out the wanted/useful signal. Thereby an effective overall cellular cooperative receiving and processing of signals of one or more mobile stations is effected.

Still another aspect of the device of the present invention includes the decision device for filtering out a wanted/useful signal of a mobile station from a plurality of superimposed signals is provided either centrally in the form of a unit in the mobile network or decentralized in several base stations of the mobile network. As described above with respect to the corresponding embodiment of the method according to the present invention a central unit or decentrally distributed components is advantageous for a decision device depending on the structure and the use of the overall cellular cooperative reception of signals by a plurality of base stations. An optimum base station for filtering out wanted/useful signals may be reliably selected with a central unit. The transmission volume of information data is reduced with a decentrally provided decision device and the individual components are accordingly smaller and less costly.

Referring now to the drawings in general, and to FIG. 1 in particular, where numeral 10 denotes a cellular mobile network. The mobile network 10 comprises base stations 12, 14, 16, 18, 20 and corresponds, for example to, the GSM-, GPRS-, EDGE-, CDMA-, CDMA2000-, UMTS-, a WLAN-standard (for example IEEE 802.11) or a standard of the 4. generation. The coverage area for reception of each base station 12, 14, 16, 18, 20 forms a network cell 22. In order to simplify the mobile network 10 such network cells 22 are often shown in a model as hexagons. For better understanding two network cells 22 are schematically illustrated by doted hexagons in FIG. 1. The network cells 22, however, are formed by each of the base stations 12, 14, 16, 18, 20. The network cells 22 have different extents in a real cellular mobile network 10 due to buildings, mountains and valleys, which is why there are often overlaps 26 of the network cells 22.

The base stations 12, 14, 16, 18, 20 form a network 28 in order for overall cellular arrangement to cooperatively detect and decode signals of one or more mobile stations with the same signal transmission resource, such as a frequency, a time slot or the like. The network 28 of the base stations 12, 14, 16, 18, 20 is illustrated in FIG. 1 in the form of a cloud and consists of network various components. The base stations 12, 14, 16, 18, 20 are connected to the network 28 by lines 30. The lines 30 may be, for example, a land line, a radio network connection or an optical network connection.

In FIG. 1, three mobile stations 32, 34, 36 are shown by way of example. The signals of the mobile stations 32, 34, 36 received by the base stations 12, 14, 16, 18, 20 on a signal transmission resource are different depending on the position of the mobile stations 32, 34, 36 and the environmental conditions. In particular, the signal of a mobile station 32, 34, 36 is received by different base stations 12, 14, 16, 18, 20 depending on the distances with different dampening and run time. Well received signals 38 are, therefore, shown with a solid line. Moderately received signals 40 are shown with a dash-dotted-line and badly received signals 42 with a dotted line. The signals 38, 40, 42 of the mobile stations 32, 34, 36 are received together by the base stations 12, 14, 16, 18, 20 in the form of a mixed or superimposed signal, because the mobile stations 32, 34, 36 use the same signal transmission resource. Such super-positions are also called interferences.

In the prior art publication "Capacity Limits of MIMO Channels" by A. Goldsmith, et al. IEEE Journal on Selected Areas in Communications, Vol. 21, No. 5 Jun. 2003, filtering out the wanted/useful signals from the superimposed signals is possible. For this purpose all required, superimposed signals must be collected and processed together. This is carried out in a selected base station 12, 14, 16, 18, 20. In order to select a base station 12, 14, 16, 18, 20 a decision device 44 with selection means 46 is connected to the network 28. A decision primarily made considering a minimum data transfer volume between the base stations 12, 14, 16, 18, 20. However, it is also possible to consider an achievable data rate of the mobile stations 32, 34, 36 or different parameters. In alternative embodiments the decision device 44 is partially or entirely formed by the distributed in a decentralized manner in the mobile network 10 which are preferably positioned in the base stations 12, 14, 16, 18, 20.

Each base station 12, 14, 16, 18, 20 is provided with a processor controlled control unit 48 provided with detection means 50 for detecting the received superimposed signal and determining means 52 for determining the respective signal quality. In order to describe the signal quality the signal-interference-noise ratio (SINR=Signal to Interference and Noise Ratio) and/or different values are used. A determined signal quality is transmitted through the network 28 to the decision device 44 by means of forwarding means 56 for all received mobile stations 32, 34, 36.

Furthermore each base station 12, 14, 16, 18, 20 is provided with transmission means 58 for transmitting received signals to a selected base station 12, 14, 16, 18, 20 in digitized form. As each base station 12, 14, 16, 18, 20 may be selected for filtering out wanted/useful signals from a plurality of received signals filter means 60 are comprised in each base station. Each base station 12, 14, 16, 18, 20 has a decoding unit 62 for decoding a wanted/useful signal from a received or filtered out signal. Furthermore each base station 12, 14, 16, 18, 20 comprises a determining device 64 for determining the decodability of a wanted/useful signal from a received superimposed signal and means 66 for transmitting a decoded wanted/useful signal to a selected base station 12, 14, 16, 18, 20. Additionally, means 68 for transmitting a received transmitted signal is provided if such a signal cannot be decoded.

Alternatively, the transmission of the received superimposed signals may also be carried out by the transmission means 58.

Figure 2:
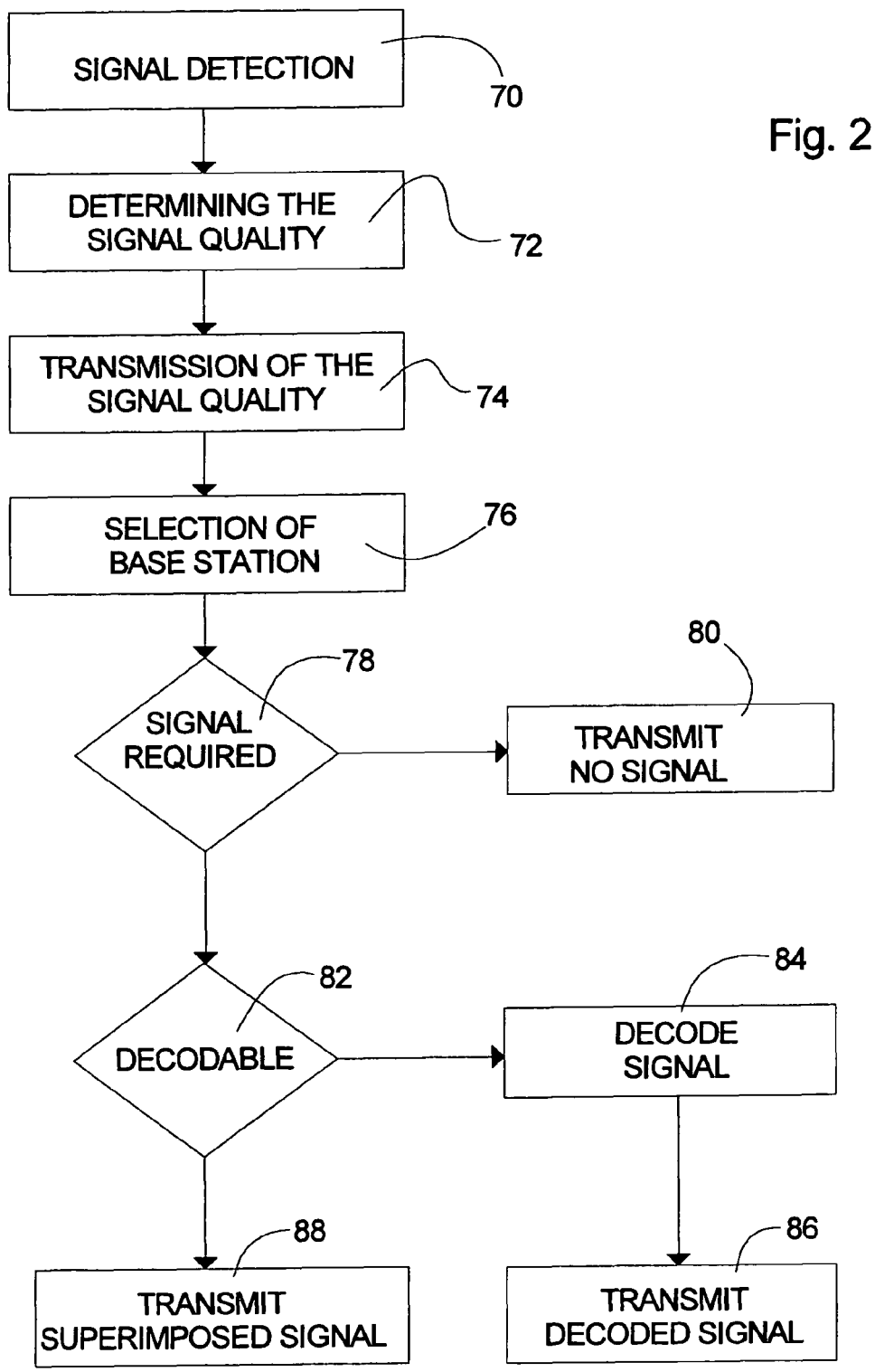
FIG. 2 is a schematic principle diagram illustrating processing functions in the method according to the present invention.

FIG. 2 illustrates the processing diagram of the method for each base station 12, 14, 16, 18, 20 as shown in FIG. 1. The operation of the device shown in to FIG. 1 and the processing steps of the method according to FIG. 2 are described hereinbelow. In FIG. 2 rectangular boxes represent steps of the method, whereas conditional branchings are illustrated by diamond-shaped boxes.

At first the superimposed signals received at each base station 12, 14, 16, 18, 20 are detected 70 with the detecting means 50 and the respective signal quality is determined 72 with the determining means 52. By way of example, (as illustrated) the base station 12 receives a good signal from mobile station 32 which is only slightly superimposed by the badly received signals of the mobile stations 34 and 36. The wanted/useful signals of the mobile station 32 may be in this example decodable from the superimposed signal received by the base station 12. The base station 14 received a moderate signal from the mobile stations 32, 34, 36, each. None of the wanted/useful signals of the mobile station 32, 34, 36 can be decoded from the mixed received signal. The base station 16 receives a bad signal from the mobile station 32 and a moderate signal from the mobile stations 34 and 36. No wanted/useful signal can be decoded from the superimposed signal received by the base station 16. The base stations 18 and 20 do not receive any signals from the mobile stations 32, 34, 36.

The above described signal qualities are transmitted 74 by the base stations 12, 14, 16, 18, 20 to the decision device 44 by the forwarding means 56. Using the signal qualities, the decision device 44 determines that the base station 14 as well as the base station 16 receive signals from the mobile stations 32, 34, 36 but cannot decode a wanted/useful signal. In order to minimize the amount of transmitted data the decision device 44 selects 76 the base station 14, for example, by means of selection means 46, for filtering out and decoding the wanted/useful signals of the mobile stations 34 and 36.

The other base stations 12, 16, 18, 20 now check or receive instructions by the decision device 44, if the superimposed signals received therein are needed for filtering out and decoding of the wanted/useful signals of the mobile stations 34, 36 in the selected base station 14. Superimposed signals received by base stations 18 and 20 do not contain signals from the mobile stations 34, 36. Therefore, the base stations 18, 20 do not transmit 80 their received signals to the selected base station 14. The base station 12 determines 82 the decodability of the wanted/useful signal of the mobile station 32 with its determining device 64 and decodes 84 the wanted/useful signal with its decoding unit 62. Subsequently, the base station 12 transmits 86 the decoded wanted/useful signal of the mobile station 32 to the selected base station 14 with means 66. The base station 16 determines 82 with its determining device 64 that no wanted/useful signal can be decoded from the superimposed signal and transmits 88 the received superimposed signal to the selected base station 14.

The base station 14 filters out the wanted/useful signals of the mobile stations 34 and 36 from the wanted/useful signal of the mobile station 32 at the base station 12, the superimposed signal received by the base station 16 and the superimposed signal received by itself by means of its filter unit 60 and its decoding unit 62. The wanted signals of all mobile end stations 32, 34 36 are now available for further processing or transmission in the mobile network 10.

By selection 76 of a base station 12, 14, 16, 18, 20 for filtering out wanted/useful signals, limiting 78 the transmission 88, 86 to signals which are indeed needed and transmits 86 decoded wanted signals a considerable reduction of the data transfer is achieved with overall cellular cooperative detection of signals in a mobile network 10.

What is claimed is:

1. A method for filtering out a wanted signal of a mobile station from a plurality of superimposed signals having a signal quality received by base stations in a cellular mobile network, wherein said superimposed signals are transmitted through a transmission resource, the method comprising the steps of:
   a) detecting said superimposed signal of said mobile station with a reached base station,
   b) determining a decodability of said wanted signal of said mobile station from said received superimposed signal at said reached base station,
   c) determining said signal quality of said received and superimposed signal for each reached base station,
   d) transmitting said signal quality to a decision device,
   e) selecting a base station for decoding and/or filtering out said wanted signals of said mobile station by means of said decision device,
   f) transmitting said received superimposed signal to said selected base station for decoding if said wanted signal cannot be fully decoded by said reached base station or transmitting said decoded wanted signal to said selected base station for filtering out said wanted signal if said wanted signal can be decoded by said reached base station,
   wherein said reached base stations transmit their received signals only to said selected base station for filtering out said wanted signal if said received signals support said filtering out said wanted signal in a digitized form, and
   wherein said selection of said selected base station is effected from one of said participating base stations which do not receive said directly decodable superimposed signal of said mobile station.

2. The method according to claim 1, wherein said decisions device is centrally provided as a unit in said mobile network.

3. The method according to claim 1, wherein said decision device is distributed on several base stations in said mobile network.

4. A device for filtering out a wanted signal of a mobile station from a plurality of superimposed signals received by base stations in a cellular mobile network, wherein said superimposed signals are transmitted through a transmission resource, the device comprising:
   a) means for detecting said superimposed signal of said mobile station with reached base stations,
   b) means for determining a decodability of said wanted signal of a mobile station from said received superimposed signal at said reached base station,
   c) means for determining a signal quality of said received and superimposed signal for each reached base station,
   d) transmission means for transmitting said signal quality to a decision device,
   e) selection means for selecting a base station for decoding and/or filtering out said wanted signal of said mobile station by means of said decision device,
   f) means for decoding and transmitting said wanted signal with sufficient signal quality to said selected base station and means for transmission of said received superimposed signals to said selected base station upon a signal quality of said received signal which is insufficient for decoding,
      wherein said reached base stations transmit their received signals only to said selected base station for filtering out said wanted signal, if said received signals support said filtering out said wanted signal in a digitized form, and wherein said selection of said selected base station is effected from one of said participating base stations which do not receive said directly decodable superimposed signal of said mobile station.

5. The device according to claim 4, further comprising an arrangement utilized by said reached base stations to transmit their received signals to said selected base station for filtering out said wanted signal.

6. The device according to claim 4 wherein said decision device is a centrally formed unit in said mobile network.

7. The device according to claim 4, wherein said decision device is distributed on several base stations in said mobile network.

8. The device according to claim 4, wherein the received superimposed signal is forwarded in a digitalized form and used by the selected base station for filtering out the wanted signal.

9. The method according to claim 4, wherein said signals received by the selected base station are not forwarded anymore and directly processed, so that the selected base station transmits only information about the signal quality to the decision device, to minimize data transfer and to ensure that the decoding of the signals can be effected/carried out by said selected base station.

10. The device according to claim 4, wherein a central decision device is provided at one of the participating base stations and separately in the mobile network, said central decision device receives the signal quality characteristic from the reached base stations based on the signal quality characteristic the central decision device determines which base station is used for filtering out the wanted/useful signals.

11. The device according to claim 10, wherein an optimum decision is made due to the central positioning of the decision device.

* * * * *